United States Patent
Sarkar

(10) Patent No.: US 7,555,005 B2
(45) Date of Patent: Jun. 30, 2009

(54) AREA EFFICIENT IMPLEMENTATION OF THE CONSECUTIVE ACCESS COUNTER

(75) Inventor: Soujanna Sarkar, W. Bengal (IN)

(73) Assignee: Texas Instruments Incorporated, Dallas, TX (US)

( * ) Notice: Subject to any disclaimer, the term of this patent is extended or adjusted under 35 U.S.C. 154(b) by 448 days.

(21) Appl. No.: 11/279,703

(22) Filed: Apr. 13, 2006

(65) Prior Publication Data

US 2006/0268925 A1 Nov. 30, 2006

Related U.S. Application Data

(60) Provisional application No. 60/671,827, filed on Apr. 14, 2005.

(51) Int. Cl.
*H04J 3/02* (2006.01)
(52) U.S. Cl. ....................... 370/462; 370/252
(58) Field of Classification Search ......... 370/200–253, 370/272–309, 431–546
See application file for complete search history.

(56) References Cited

U.S. PATENT DOCUMENTS

| 5,758,075 A | * | 5/1998 | Graziano et al. | 709/250 |
| 6,076,157 A | * | 6/2000 | Borkenhagen et al. | 712/228 |
| 7,062,582 B1 | * | 6/2006 | Chowdhuri | 710/116 |

* cited by examiner

*Primary Examiner*—Ricky Ngo
*Assistant Examiner*—Iqbal Zaidi
(74) *Attorney, Agent, or Firm*—Robert D. Marshall, Jr.; Wade J. Brady, III; Frederick J. Telecky, Jr.

(57) ABSTRACT

An arbitration unit grants access to a shared resource to one of a plurality of devices. A consecutive access register corresponds to each device. A consecutive access counter is operable to load data stored in a selectable consecutive access register and count down each operating cycle. An arbitration control unit selects one device for access to the shared resource from among all currently requesting access. Upon selection, the consecutive access counter is loaded from the corresponding consecutive access register. Access is re-arbitrated upon count down to zero. Time out registers and corresponding time out counters for each device permit advance to a higher priority after a time out following an ungranted request.

8 Claims, 4 Drawing Sheets

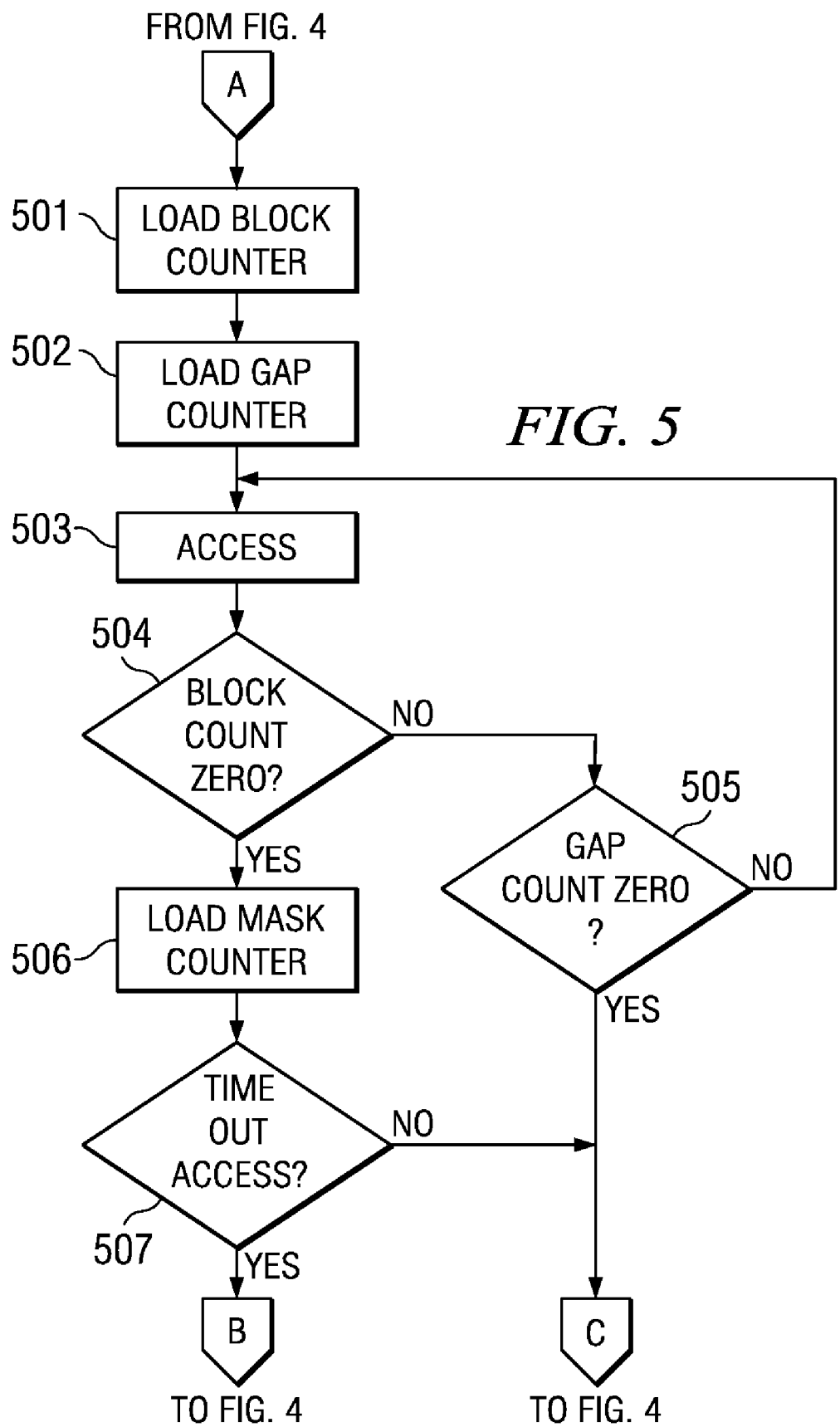

US 7,555,005 B2

AREA EFFICIENT IMPLEMENTATION OF THE CONSECUTIVE ACCESS COUNTER

CLAIM OF PRIORITY

This application claims priority under 35 U.S.C. 119(e)(1) to U.S. Provisional Application No. 60/671,827 filed Apr. 14, 2005.

TECHNICAL FIELD OF THE INVENTION

The technical field of this invention is arbitrating among plural service requesters for access to a service device.

BACKGROUND OF THE INVENTION

It is known in art to control access to a device via arbitration. In a typical system-on-chip (SoC), a system resource, such as a memory or peripheral, is shared by multiple accessors. In the field of this invention requesting devices typically have priorities relative to other requesting devices. The device with the higher priority is granted access. In many systems this priority is dynamically allocated. For example, the last requester to be granted access may be given the highest priority. On the other hand, priority may be statically assigned to permit a high priority requester to have its needed access. One of these may be given ultra high priority, meaning that the arbiter always gives this accessor priority over all others. In this case some control over the grant and masking of the ultra high priority request is typical to meet the bandwidth requirements of the ultra high priority accessor as well as for all the remaining accessors.

A common solution to this problem is periodically allocating a time slot for the ultra high priority requester. During this time period, no other requester is granted access to the resource. However, such a scheme is sensitive to the time alignment of the request and thus may not help in meeting the real time requirements. For the same reason, it may also waste bandwidth for the remaining requesters. Other solutions grant access to the ultra high priority accessor each time another requester completes one access. Thus the ultra high priority requester is sure to get access on a regular basis. This may not be sufficient to meet the real time requirements of the high priority requester and it may hurt the bandwidth requirements of other accessors. However, the user does not have control over resource allocation in both the above cases.

Thus there is a need in the art for a flexible scheme to control arbitration to allocate accesses to a shared resource by plural requesting devices.

SUMMARY OF THE INVENTION

This invention implements a software programmable dynamic scheme for controlling the granting and masking of the arbitration request of an ultra high priority requester. This invention allows the ultra high priority requester to have access to the shared resource for a programmable number of accesses based on the data access pattern. This invention masks this high priority requester for a programmable amount of time. This permits other requesters to meet their real time requirements.

BRIEF DESCRIPTION OF THE DRAWINGS

These and other aspects of this invention are illustrated in the drawings, in which:

FIG. 5 is a flow chart illustrating some other operations of the arbitration control unit illustrated in FIG. 3.

DETAILED DESCRIPTION OF PREFERRED EMBODIMENTS

Figure 1:
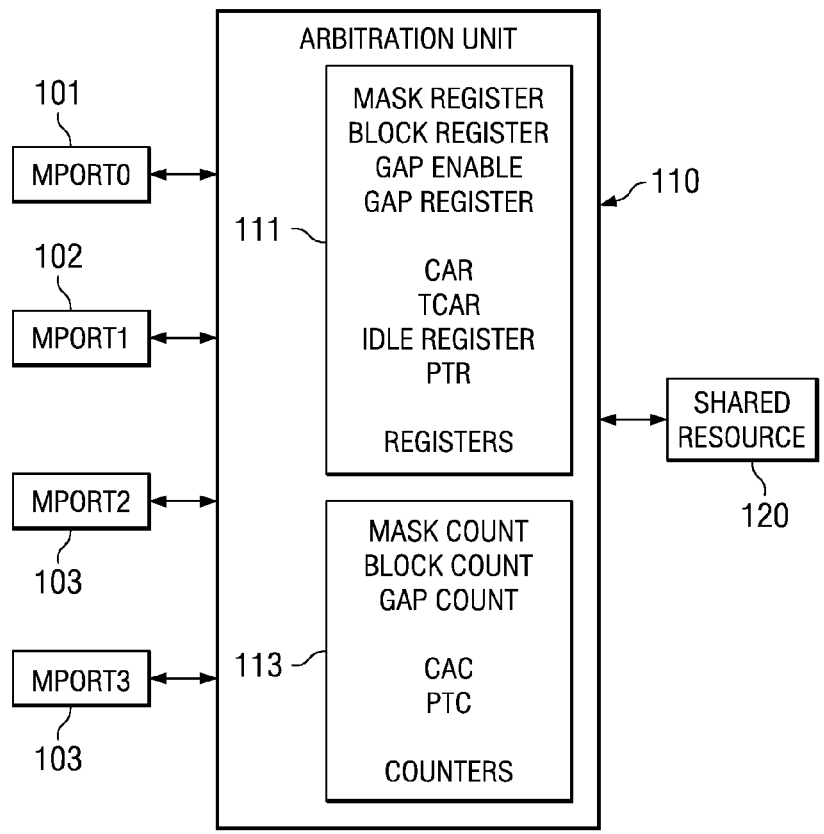
FIG. 1 illustrates this invention including plural access requesters whose access to a shared resource is controlled by an arbitrator.

FIG. 1 illustrates the plural requester devices and the arbitrator of this invention. The devices include Mport0 101, Mport1 102, Mport2 103 and Mport3 104. Each of these devices is connected to arbitration unit 110. Arbitration unit 110 receives access requests from devices 101, 102, 103 and 104 and selects one for access to shared resource 120. Arbitration unit 110 includes registers 111 and counters 113. Registers 111 include a mask register, a block register, a gap enable bit and a gap register associated with Mport0 101. Registers 111 include a consecutive access register (CAR), a time out consecutive access register (TCAR), an idle register and a priority time out register (PTR) associated with each of Mport1 to Mport3. In the preferred embodiment these registers are memory mapped into the memory space of a data processor. Arbitration unit 110 grants access to one requesting Mport to shared resource 120.

Figure 2:
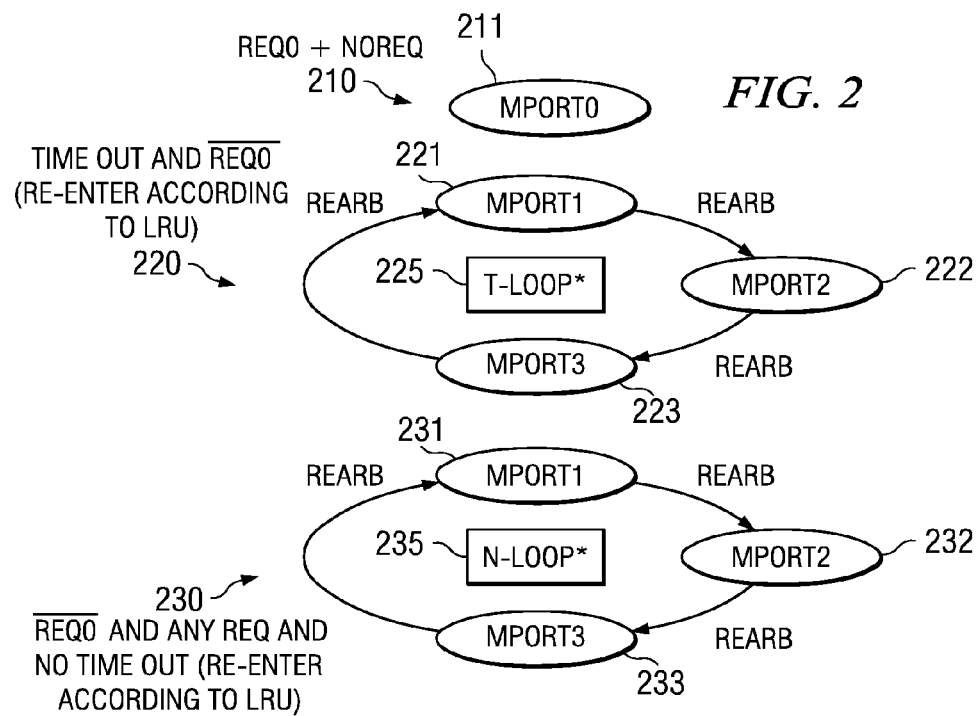
FIG. 2 illustrates the priority hierarchy according to this invention.

FIG. 2 illustrates the priority hierarchy of this invention. There are three levels of hierarchy: ultra priority 210; time out priority 220; and normal priority 230. In this example the ultra high priority level is limited to Mport0 101. Any of Mport1 102, Mport2 103 and Mport3 104 may have time out priority or normal priority depending upon current conditions. Priority within the time out priority 220 and the normal priority 230 is based upon a least recently used scheme.

Ultra priority level 210 is occupied solely by Mport0 101. Since there is only one device at this priority level there is no need to arbitrate between requesters. Any of mport1 to mport3 can be within time out priority level 220. Within time out priority level 220 access is granted to the requesting timed out device least recently serviced. This is illustrated schematically in FIG. 2 by the loop of Mport1 221, Mport2 222 and Mport3 223 around T-loop control 225. Any of Mport1 to Mport3 can be at the default normal priority level 230. Within normal priority level 230 access is granted to the requesting device least recently serviced. This is illustrated schematically in FIG. 2 by the loop of Mport1 231, Mport2 232 and Mport3 233 around N-loop control 235. Arbitration unit 110 stores a two deep running history of the last two changes in granted Mport used in common within the time out priority level 220 and normal priority level 230.

Devices move into timeout priority level 220 based on per device programmable time out values. This time out value is stored in the corresponding priority time out register (PTR) within registers 111. Each device may perform a programmable number of accesses once they have been granted access. The number of accesses at the normal priority level 230 is stored in a corresponding consecutive accesses register (CAR) within registers 111. The number of accesses at the time out priority level (220) is stored in a corresponding time out consecutive accesses register (TCAR) within registers 111. Each Mport has an associated consecutive access counter (CAC) and a priority timeout counter (PTC) within counters 113 to control these functions.

The LRU priority keeps a running history of the last 2 changes in granted MPorts. In either the time out priority level 220 or the normal priority level 230 and when jumping between arbitration loops, the requesting master which has least recently gained access is always given the next access. In the timeout loop, only timed out ports are considered for arbitration, but still following the LRU priority. The default LRU history after reset is such that if all Mports were requesting, grants would initially occur in the following order MPort1, Mport2 and Mport3. MPort0 is a special case and always has ultra high priority level 210 when actively requesting. Time out priority level 220 is active whenever any Mport times out. Only requests from Mports which are currently timed out will be considered in this loop following the LRU scheme. Once all timed out Mports have been allowed an access and no timed out Mports are requesting, the scheme operates at the normal priority level 230 again honoring the LRU scheme.

Figure 3:
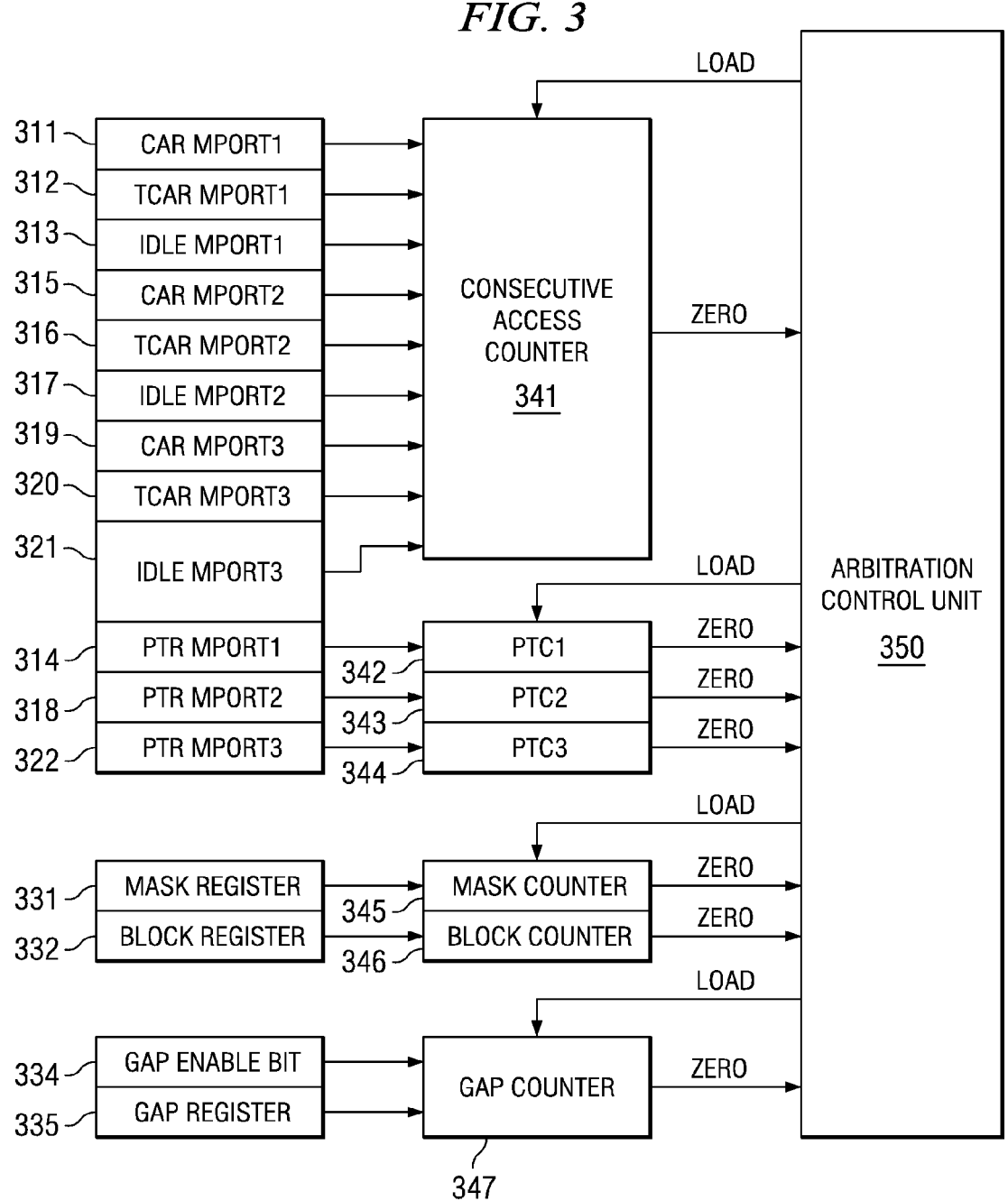
FIG. 3 illustrates some details of the arbitration unit illustrated in FIG. 2.

FIG. 3 illustrates some details of arbitration unit 110 of FIG. 2. FIG. 3 illustrates the registers of registers 111 and the counters of counters 113. Registers 111 includes some registers for Mport0 101 and some registers for each of Mport1 102, Mport2 103 and Mport3 104. Associated with Mport1 102 are consecutive access register (CAR) 311, time out consecutive access register (TCAR) 312, idle register (IDLE) 313 and priority time out register (PTR) 314. Associated with Mport2 103 are consecutive access register (CAR) 315, time out consecutive access register (TCAR) 316, idle register (IDLE) 317 and priority time out register (PTR) 318. Associated with Mport3 104 are consecutive access register (CAR) 319, time out consecutive access register (TCAR) 320, idle register (IDLE) 321 and priority time out register (PTR) 322. CARs 311, 315, 319, TCARs 312, 316 and 320 are loaded into consecutive access counter (CAC) 341 are appropriate times which will be explained below. Idle registers 313, 317 and 321 control the counting in consecutive access counter 341 in a manner more fully explained below. PTR register 314 is loaded into PTC1 342 when Mport1 generates an ungranted access request at the normal priority level 230. PTR register 318 is loaded into PTC2 343 when Mport2 generates an ungranted access request at the normal priority level 230. PTR register 322 is loaded into PTC3 344 when Mport3 generates an ungranted access request at the normal priority level 230.

Mask register 331, block register 332, GAP enable bit 334 and GAP register 335 are associated with Mport0 101. Mask register 331 is loaded into mask counter 345 at appropriate times that will be more fully described below. Block register 332 is loaded into block counter 346 are appropriate times that will be more fully described below. GAP register 335 is loaded into GAP counter 347 at appropriate times when enabled by GAP enable bit 334.

The counters CAC 341, PTC1 342, PTC2 343, PTC3 344, mask counter 345, block counter 346 and GAP counter 347 include an input corresponding to machine cycles. This could take the form of a clock signal controlling operation of the device including the arbitration mechanism of this invention. These machine cycles should be related to the minimum amount of access to shared resource 120. These counters count these machine cycles.

Arbitration control unit 350 controls the loading of CAC 341, PTC1 342, PTC2 343, PTC3 344, mask counter 345, block counter 346 and GAP counter 347 via corresponding Load enable lines. Arbitration control unit 350 is responsive to count to zero of these counters via corresponding zero lines. Arbitration control unit 350 controls arbitration and grant of access in a manner not shown in FIG. 3 but better illustrated in FIG. 1.

Figure 4:
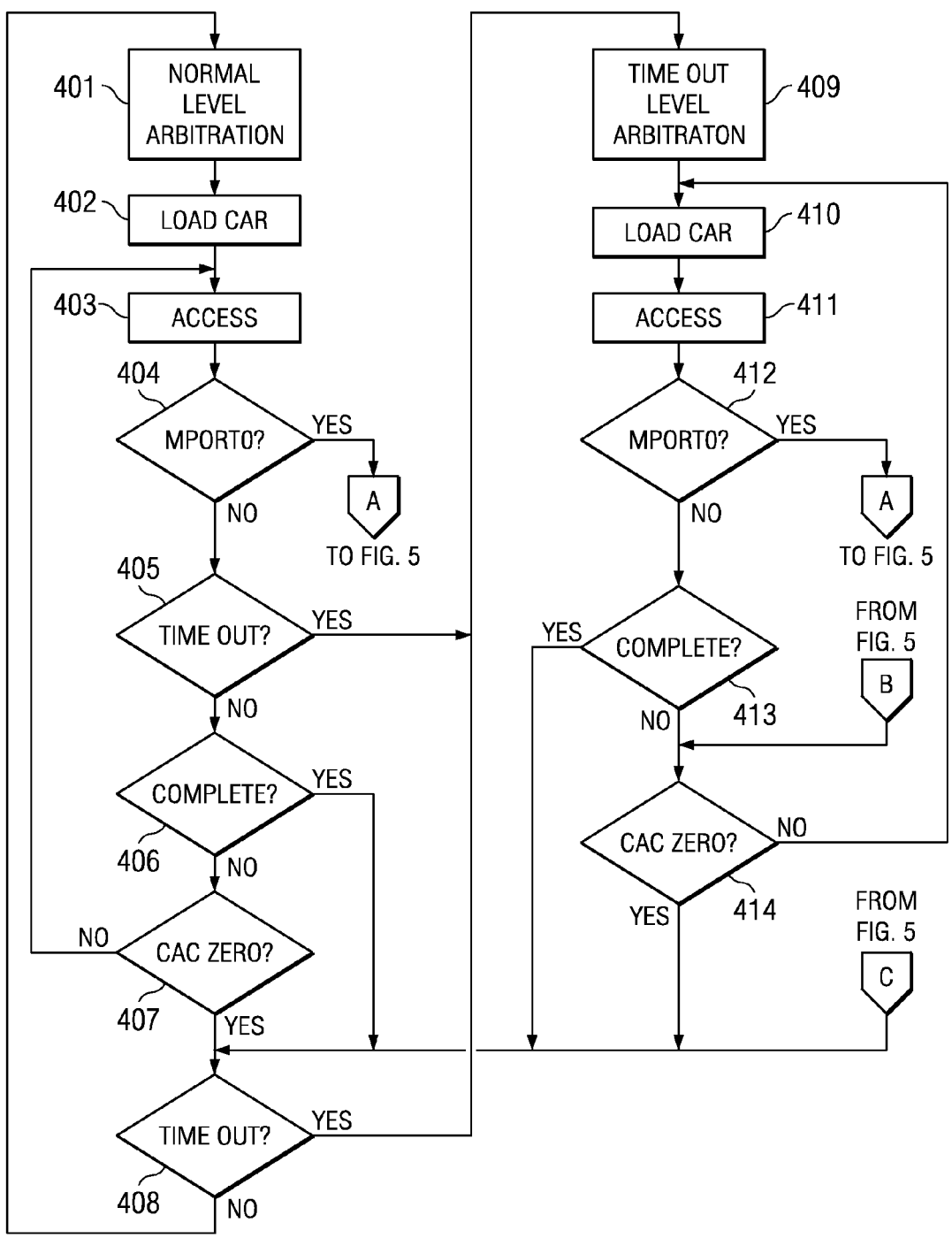
FIG. 4 is a flow chart illustrating some of the operations of the arbitration control unit illustrated in FIG. 3.

FIG. 4 illustrates a flow chart covering some of the operations of arbitration control unit 350. These operations noted are central to the operation of this invention. The flow chart of FIG. 4 is merely an outline of the operation of this invention. One skilled in the art would recognize that an operating embodiment would need various conventional additions that are not described here.

This flow chart begins with normal level arbitration block 401. Flow generally reaches this block because one or more of Mport1 102, Mport2 103 and Mport3 104 generates a normal priority level access request. Normal level arbitration block 401 selects one device and grants access to the selected device in the manner according to the least recently used (LRU) scheme previously described. Next block 402 loads consecutive access counter 341 with the data contents of CAR 311, CAR 315 or CAR 319 corresponding to the Mport granted access. In the preferred embodiment once loaded, CAC 341 counts down machine cycles until reaching zero. It is known in the art that the same time interval can be measured by counting up from zero to the count in the source register. In the preferred embodiment this consecutive access number stored CAR 311, CAR 315 or CAR 319 is selectable as 1, 4, 8 or 16. Thus CAC 341 counts down from 1, 4, 8 or 16. Note that because CAC 341 operates only for the Mport granted access, there is no conflict in using a single CAC 341 for data sourced from CAR 311, TCAR 312, CAR 315, TCAR 316, CAR 319 and TCAR 320.

The corresponding IDLE register 313, 317 or 321 determines whether Mport accesses are considered sequential. In the preferred embodiment the IDLE registers 313, 317 and 321 may indicate 0, 2, 4 or 6 idle cycle between accesses for them to be considered sequential. This permits the system to handle cases where the requested accesses are not always sequential but are "bursty." Such bursty accesses occur in multiples with short idle periods between. The consecutive access counter 341 operates to count consecutive accesses as defined by the corresponding IDLE register of the accessing mPort.

The flow next makes a shared resource access at block 403. As explained above, each such access is considered in the consecutive access counter 341 depending on its relationship to the previous access. Test block 404 determines whether Mport0 101 generates an ultra priority access request. As previously described, Mport 101 has an ultra priority serviced at ultra priority level 210. If such an access request is received (Yes at test block 404), then the flowchart branches to another sequence illustrated in FIG. 5 via link A.

If no such ultra priority access request is received (No at test block 404), test block 405 determines if another Mport has timed out. Upon each access request by one of Mport1 102, Mport2 103 or Mport3 104 that is not granted access, the corresponding register PTR 314, PTR 318 or PTR 322 is loaded into its corresponding PTC1 342, PTC2 343 or PTC3 344. Upon count down to zero by any of the priority time out counters 342, 343 or 344, a re-arbitration occurs at the time out priority level 220. Thus if a time out occurs (Yes at test block 405), flow goes to block 409 for a time out level 220 arbitration. This will be further described below.

If no time out occurs (No at test block 405), the flow goes to test block 406 which determines if the last access at block 403 was the final requested access, i.e. is the requested access complete. If so (Yes at test block 406), flow goes to test block 408 to test for a time out. This will be further described below.

If the requested access is not complete (No at test block 406), then the flow goes to test block 407. Test block 407 determines if the number of consecutive accesses set in the corresponding consecutive access register have occurred. If not (No at test block 407), flow returns to block 403 for the next access.

If the number of consecutive access has occurred (Yes at test block 407), then a re-arbitration occurs. Test block 408 determines if there is a pending time out by any other Mport. If not (No at test block 408), then the re-arbitration occurs at block 401. This arbitration occurs at the normal priority level 230. The Mport granted access depends on which are currently requesting access and the least recently used (LRU) history data. If no other Mport is requesting access, then the Mport of the prior access which was ended by the CAC count to zero is granted access. If another Mport requests access, then the Mport granted access is selected according to the LRU history.

If a time out has occurred (Yes at either test block 405 or test block 408), then the re-arbitration occurs at the time out priority level 220 in block 409. Block 409 only considers Mports making access requests that have timed out. This is arbitrated using the same LRU history as used for normal level priority 230 arbitration. Time out level arbitration block 409 selects one device and grants access to the selected device. Next block 410 loads consecutive access counter 341 with the data contents of TCAR 312, TCAR 316 or TCAR 320 corresponding to the Mport granted access. The value stored in one of the time out consecutive access registers can differ from the value stored in the corresponding consecutive access register. This feature could be used to grant greater consecutive access for the time out case because the device has been waiting for access.

The corresponding IDLE register 313, 317 or 321 determines whether Mport accesses are considered sequential as previously described. The consecutive access counter 341 operates to count consecutive accesses as defined by the corresponding IDLE register of the accessing mPort.

The flow next makes a shared resource access at block 411. As explained above, each such access is considered in the consecutive access counter 341 depending on its relationship to the previous access. Test block 412 determines whether Mport0 101 generates an ultra priority access request. If such an access request is received (Yes at test block 412), then the flowchart branches to another sequence illustrated in FIG. 5 via link A.

If no such ultra priority access request is received (No at test block 412), test block 413 determines if the last access at block 411 was the final requested access, i.e. is the requested access complete. If so (Yes at test block 413), flow goes to test block 408 to test for a time out. This will be further described below.

If the requested access is not complete (No at test block 413), then the flow goes to test block 414. Test block 414 determines if the number of consecutive accesses set in the corresponding consecutive access register have occurred. If not (No at test block 414), flow returns to block 410 for the next access.

If the number of consecutive access has occurred (Yes at test block 414), then a re-arbitration occurs. Test block 408 determines if there is a pending time out by any other Mport. If not (No at test block 408), then the re-arbitration occurs at block 401. This arbitration occurs at the normal priority level 230. The Mport granted access depends on which are currently requesting access and the least recently used (LRU) history data. If another Mport has timed out (Yes at test block 408), then this re-arbitration occurs at time out level arbitration 409 in the manner previously described.

FIG. 5 illustrates a flow chart of the operation of arbitration control unit 350 for ultra priority level 210 operations. As previously described, only Mport0 101 operates at the ultra priority level 210, so no arbitration is needed at ultra priority level 210. The flow chart of FIG. 5 is entered via link A from test block 404 or test block 412 of FIG. 4. Block 502 loads block counter 346 from block register 332. Block counter 346 counts the number of consecutive Mport0 accesses permitted before re-arbitration. This is similar to the consecutive accesses counted by CAC 341. Block 503 loads GAP counter 347 from GAP register 335. GAP counter 347 is enabled or disable by the state of GAP enable bit 334. In the preferred embodiment, when GAP enable bit 334 is 0, GAP counter 347 is disabled and any break in accesses is counted as a block by block counter 346. When GAP enable bit 334 is 1, GAP counter 347 is enabled. GAP counter 347 counts idle cycles since the last access by Mport0 101. It is reset by re-loading from GAP register 335 upon each access by Mport0 101. In the preferred embodiment GAP register 335 can have the values 0, 64, 128 or 256.

Flow next performs an access to shared resource 120 (block 503). Test block 504 determines if the block count is zero. This indicates that the number of block accesses specified in block register 335 have occurred. If this has not occurred (No at test block 504), then test 505 determines if the GAP counter is zero. A zero GAP counter means that a larger gap between block accesses has occurred than the number stored in GAP register 335. Note that if GAP counter 347 is disabled by GAP enable bit 334, then the GAP count is always zero. If the GAP count is not zero (No at test block 505), then block 503 performs another access. If the GAP counter was zero (Yes at test block 505), flow passes to test block 408 in FIG. 4 via link C. This provides a re-arbitration at normal level arbitration block 401 or time out level arbitration block 409 depending on whether there are any timed out Mports as determined by test block 408.

If the block count is zero (Yes at test block 504), then block 506 loads the value stored in Mask register 331 into mask counter 345. Mport0 101 cannot generate an ultra priority access request until expiration of the time measured by count in mask counter 345. This masking prevents Mport0 101 requests from taking too much bandwidth from the other Mports. In the preferred embodiment the value stored in Mask register 331 can be 0 and any integer from 2 to 2048. Note if Mask register 331 stores 0, Mport0 101 accesses are never masked and can interrupt any other access at any time.

Test block 507 determines if the past Mport0 101 access interrupted a time out priority level access. If so (Yes at test block 507), then flow passes to test block 414 in FIG. 4 via link B. This enables an interrupted time out priority level access to complete if not already completed as determined by test block 414. If not (No at test block 507), flow goes to test block 408 via link C. Test block 408 selects re-arbitration via normal level arbitration block 401 or time out level arbitration 409.

The arbitration of this invention controls bandwidth allocation of a plurality of devices. In the preferred embodiment of this invention, there are two queues; a normal priority queue; and a time out priority queue. A device is in the normal priority queue by default and enters the high priority queue only when it times out. One device has an ultra high priority and the consecutive access count restriction does not apply to it. When the ultra high priority device has access to the shared resource, no other device can get access. After completing its quota of accesses, the ultra high priority device is masked.

The remaining devices can get to share the resource. The priority in descending order is: unmasked ultra high priority; time out priority; and normal priority. A higher priority can interrupt a lower priority and obtains access once the currently ongoing access completes. When the ultra high priority device interrupts a timed out device whose consecutive access count is not complete, the grant returns back to the interrupted device. If not interrupted, a device in the normal priority level gets to complete its consecutive access count before arbitration happens. A single counter can be used to serve all situations that may arise. At any given point of time, there is a single device granted access. If it is in the normal priority level, the counter counts down till completion. If not interrupted the counter is reloaded with the consecutive access count of the device that is given the next grant. If the ultra high priority device interrupts, then this counter stops counting. If a device in the time output priority level interrupts a device in the normal priority, then the counter is loaded with the consecutive count for the high priority device and starts counting down. If the ultra high priority device interrupts before the consecutive access count completes, the counter stops counting and restarts only when the ultra high priority device has completed its accesses. This invention could be practiced employing more than two priorities by providing a consecutive access register for each device for each priority.

There are several ways this could have been implemented in hardware. There could be two counters for device, one for counting when it is in the normal priority and the other one for counting when it is in time out priority. The described embodiment including three devices would need six such counters. Another solution includes three counters, where each device has a single counter which can be shared between normal priority operation and time out priority operation. A single device will be in only one priority at any point of time. Yet another solution includes two shared counters, one for normal priority and other one for time out priority. This invention is the most efficient in terms of area since it reuses a single counter.

This invention is the most area efficient implementation since it shares a single counter for all the devices in both normal and time out priority. Sharing this one counter requires some hardware overhead for selecting the count to be loaded. This is smaller in area than 6 separate counters. The incremental overhead for sharing a single counter versus sharing two or three counters is minimal.

What is claimed is:

1. An arbitration unit granting access to a shared resource to one of a plurality of devices comprising:
    a plurality of consecutive access registers, one corresponding to each of said plurality of devices;
    a single consecutive access counter connected to each of said consecutive access registers operable to load data stored in a selectable one of said consecutive access registers and count down each operating cycle, said single consecutive access counter generating a zero count signal indicative when said count down reaches zero; and
    an arbitration control unit connected to each device and to said single consecutive access counter, said arbitration control unit operable to
        select one device for access to said shared resource from among all devices then currently requesting access,
        upon selection of one device for access, load data in said corresponding consecutive access register into said single consecutive access counter, and
        re-arbitrate among all devices then currently requesting access upon receipt of said zero count signal indicating count down to zero.

2. The arbitration unit of claim 1, wherein:
said arbitration control unit is operable to
    select one device for access to said shared resource from among all devices then currently requesting access by selection of a requesting device least recently used.

3. The arbitration unit of claim 1, wherein:
each of said plurality of consecutive access registers are memory mapped and accessible at predetermined corresponding memory addresses.

4. The arbitration unit of claim 1, wherein:
each of the plurality of devices can have a plurality of priorities of request within a hierarchy of priorities;
said plurality of consecutive access registers includes one consecutive access register corresponding to each of the plurality of devices for each of the plurality of priorities; and
said arbitration control unit is further operable to
    select one device for access to said shared resource from among all devices then currently requesting access at a highest priority of request,
    upon selection of one device for access, load data in said consecutive access register corresponding to said selected device and said current request priority into said single consecutive access counter.

5. The arbitration unit of claim 4, wherein:
said arbitration control unit is operable to
    select one device for access to said shared resource from among all devices then currently requesting access by selection of a requesting device least recently used at said highest priority.

6. The arbitration unit of claim 4, wherein:
each of said plurality of consecutive access registers are memory mapped and accessible at predetermined corresponding memory addresses.

7. The arbitration unit of claim 4, further comprising:
a plurality of time out registers, one corresponding to each of said plurality of devices;
a plurality of time out counters, one corresponding to each of said plurality of devices, each time out counter operable to load data from the corresponding time out register and count down each operating cycle, said time out counter generating a zero count signal indicative when said count down reaches zero; and
wherein said arbitration control unit is further operable to
    load data from a time out register into a time out counter when said corresponding device requests access and said arbitration control unit fails to grant access,
    advance a device request from a current priority to a higher priority upon receipt of said zero count signal from a corresponding time out register indicating count down to zero.

8. The arbitration unit of claim 7, wherein:
each of said plurality of time out registers are memory mapped and accessible at predetermined corresponding memory addresses.

* * * * *